(12) United States Patent
Lin

(10) Patent No.: US 7,385,324 B2
(45) Date of Patent: Jun. 10, 2008

(54) MAGNETIC CONTROL WHEEL WITH A MAGNETIC RING

(76) Inventor: Lily Lin, No. 278, Sijhou Road, Yuanshan Township, YiLan County 264 (TW)

( * ) Notice: Subject to any disclaimer, the term of this patent is extended or adjusted under 35 U.S.C. 154(b) by 228 days.

(21) Appl. No.: 11/332,355

(22) Filed: Jan. 17, 2006

(65) Prior Publication Data

US 2007/0167294 A1    Jul. 19, 2007

(51) Int. Cl.
H02K 7/02 (2006.01)
H02K 15/03 (2006.01)

(52) U.S. Cl. .............................. 310/74; 310/42; 482/64
(58) Field of Classification Search ................ 310/74, 310/153, 156.11, 156.14, 42
See application file for complete search history.

(56) References Cited

U.S. PATENT DOCUMENTS

| | | | | |
|---|---|---|---|---|
| 5,811,906 A * | 9/1998 | Hakala et al. | ............... | 310/183 |
| 6,046,519 A * | 4/2000 | Hanazumi et al. | ......... | 310/49 R |
| 6,191,516 B1 * | 2/2001 | Froehlich et al. | ....... | 310/156.08 |
| 6,246,142 B1 * | 6/2001 | Asao et al. | ................... | 310/217 |
| 6,384,503 B1 * | 5/2002 | Iwaki et al. | ............ | 310/156.47 |
| 6,804,874 B2 * | 10/2004 | Niimi et al. | ................... | 29/596 |
| 6,867,525 B2 * | 3/2005 | Ionel et al. | ............. | 310/156.47 |
| 2005/0012418 A1 * | 1/2005 | Chou et al. | ............. | 310/156.08 |
| 2007/0035192 A1 * | 2/2007 | Jeon et al | .............. | 310/156.38 |
| 2007/0167294 A1 * | 7/2007 | Lin | ............................... | 482/63 |

* cited by examiner

Primary Examiner—Burton Mullins
(74) Attorney, Agent, or Firm—Rosenberg, Klein & Lee

(57) ABSTRACT

A magnetic control wheel having a flywheel and a magnetic ring. The magnetic ring is a plate with magnetic permeability that is mounted around the periphery of the flywheel. The connection line at the front and rear joint of the magnetic ring meets an end face of the flywheel at a non-right angle. The reaction of this connection line to the magnetic field of the magnets is focused at only one point rather than at a line at the same time. In this way, the vibration and noise of the magnetic control wheel can be considerably minimized to achieve a longer service life.

1 Claim, 7 Drawing Sheets

MAGNETIC CONTROL WHEEL WITH A MAGNETIC RING

BACKGROUND OF THE INVENTION

1. Field of the Invention

The invention relates to a magnetic control wheel with a magnetic ring, and more particularly to a magnetic ring whose joint is changed in such a way that the line at the joint meets the end face 211 of the flywheel 21 at a non-right angle. In this way, the magnetic gap and the magnetic field being cut can be protected from direct face-to-face collision that causes vibration.

2. Description of the Related Art

A plurality of fitness apparatuses are fitted with a flywheel for providing an inertia force by rotation that can be utilized either as exercise loading or even as means for adjusting the loading. Accordingly, a magnetic control wheel was developed. As shown in FIG. 1, a magnetic control wheel was developed. As shown in FIG. 1, a magnetic control wheel 11 is fitted to an exercise bike. A magnetic control element 14 with a plurality of magnets 13 is installed to create a magnetic field for applying a certain magnetic resistance to the flywheel.

As shown in FIG. 2, the magnetic control wheel 11 serves as a resistance system for a fitness apparatus. Normally, a so-called magnetic ring 12 having excellent electric or magnetic conductivity is interposed between the flywheel 11 and the magnets 13 for improving the property of the electric or magnetic conductivity.

According to different requirements on material quality and cost, the magnetic ring 12 can be divided into different types. One of them is the permanent magnet type by use of aluminum and copper to be primary material for the magnetic ring. Due to the excellent electric conductivity, eddy current can be created on the surface of the magnetic ring, thereby creating a greater resistance.

Another type is applied to the electromagnetic system brake and hybrid generator that primarily employs silicon steel or steel material with low carbon content to be primary material for the magnetic ring. Due to the excellent magnetic conductivity, the resistance caused by cutting the magnetic field lines can be increased.

In taking easy fabrication and low cost into account, the magnetic ring 12 is formed into a ring shape by stamping a plate. Thereafter, the magnetic ring 12 is mounted on the flywheel 11. According to FIG. 2, the magnetic ring 12 is mounted on the external side of the flywheel 11. As shown in FIG. 3, the magnetic ring 12 is mounted on the internal side of the flywheel 11 in adjustment to the magnets 13 of the internal type magnetic control element 15. As shown in FIG. 4, a magnetic control apparatus 16 for the electromagnetic system brake and the hybrid generator includes an electromagnetic coil 17 applying magnetic resistance to the flywheel 11 and the external type magnetic ring 12.

The above-mentioned configuration of the magnetic rings 12 cannot be completely sealed at the joints as if no joints were present. Meanwhile, the welding material does not correspond to the material of the magnetic ring. Thus, magnetic gaps or areas with different permeability will be created in interaction with the magnetic field. Vibrations will arise when the magnetic gaps or areas with different permeability interact with the magnetic field in operation of the flywheel 11, thereby affecting the performance and the service life of the magnetic control wheel in a negative manner.

At present, most of the lines 121 at the joint of the magnetic ring 12 are designed to be perpendicular to the end face of the flywheel 11. This just corresponds to the distribution of the magnetic field of the magnetic control wheel. In this way, the magnetic gap and the magnetic field to be cut collide to each other in a face-to-face way. In other words, the magnetic gaps are opened to a maximal extent and lie opposite to the magnetic field. The magnetic gaps and the different magnetic permeability will cause a loosening and tightening action on the rotation of the flywheel (because of difference in permeability). Thus, vibration of the flywheel arises. If the magnets are fixed in a loose way, vibration will arise in the areas of the magnets, thereby giving out sound. If the magnets are fixed in a tight way, the flywheel creates vibration. Normally, bearing (not shown) is mounted on the flywheel 11. Therefore, the bearing on the flywheel will be affected by a heavier magnetic force to make noise due to vibration. Accordingly, the service life will be reduced.

Therefore, the magnetic resistance mechanism of the conventional magnetic control wheel still leaves much to be desired and is required for improvement.

SUMMARY OF THE INVENTION

A primary object of the invention is to provide a magnetic control wheel with a magnetic ring that can effectively reduce the vibration and noise of the flywheel for a longer service life thereof.

In order to reach the above-mentioned object, the magnetic control wheel in accordance with the invention includes a flywheel and a magnetic ring. The magnetic ring is a plate with magnetic permeability that is mounted around the periphery of the flywheel. The connection line at the front and rear joint of the magnetic ring meets an end face of the flywheel at a non-right angle. Therefore, the connection line can be selected from a group consisting of oblique line, V-shaped line, circular arc line, etc.

BRIEF DESCRIPTION OF THE FIGS.

DETAILED DESCRIPTION OF THE PREFERRED EMBODIMENT

Figure 1:
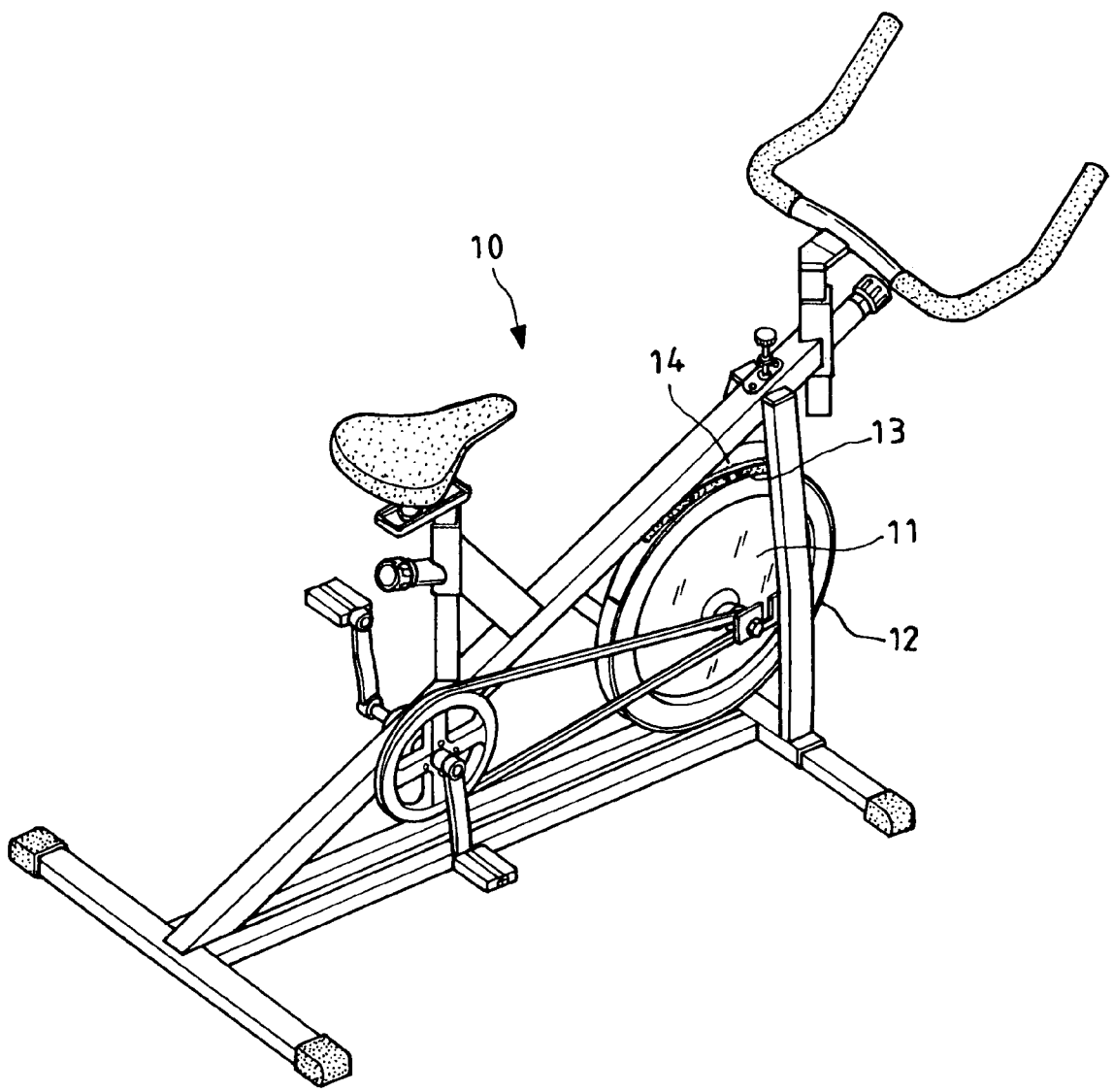
FIG. 1 is a perspective view of a magnetic control wheel on an exercise bike of the prior art.
Figure 2:
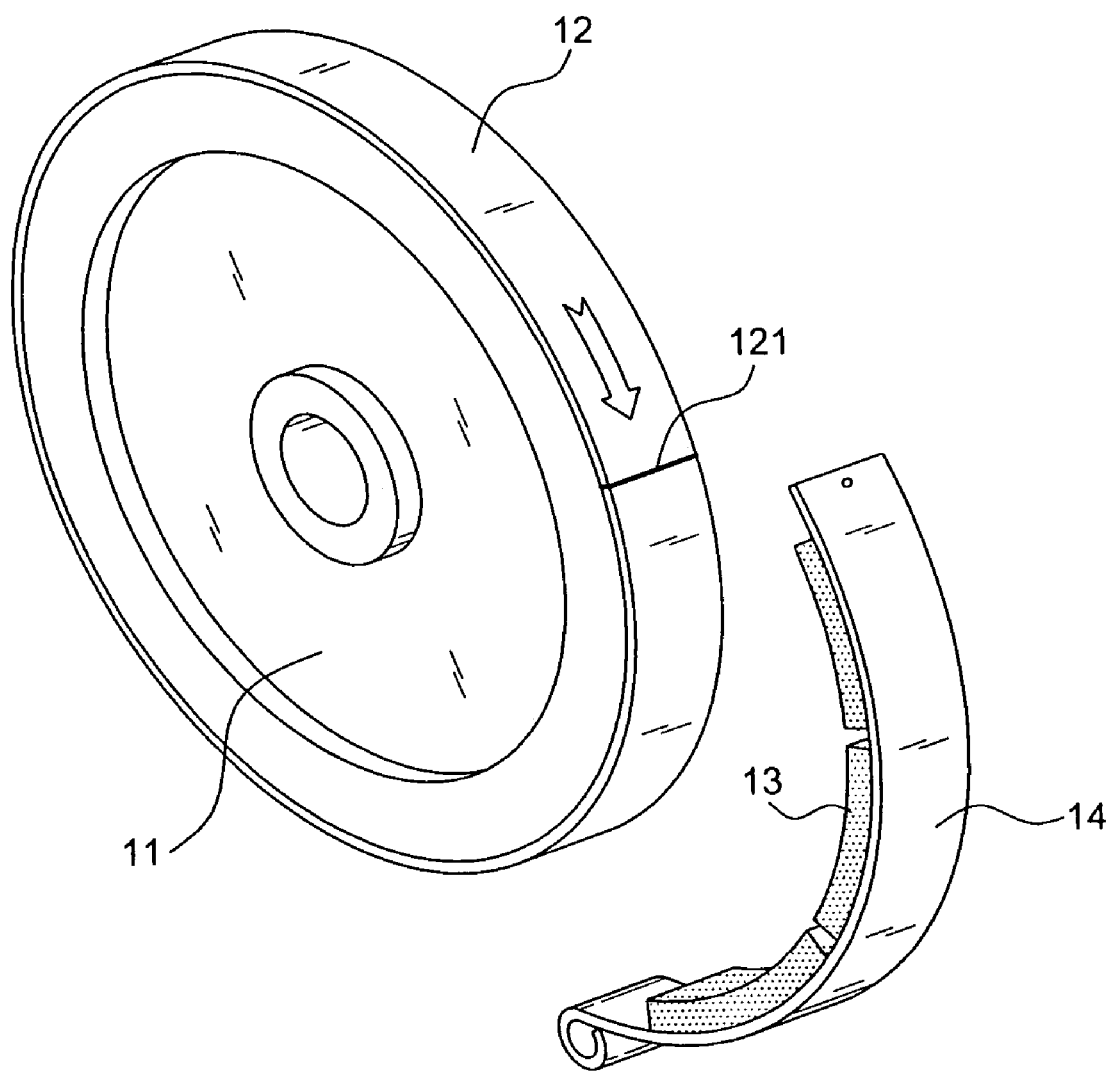
FIG. 2 is a perspective view of a magnetic ring to be externally mounted on the magnetic control wheel of the prior art.
Figure 3:
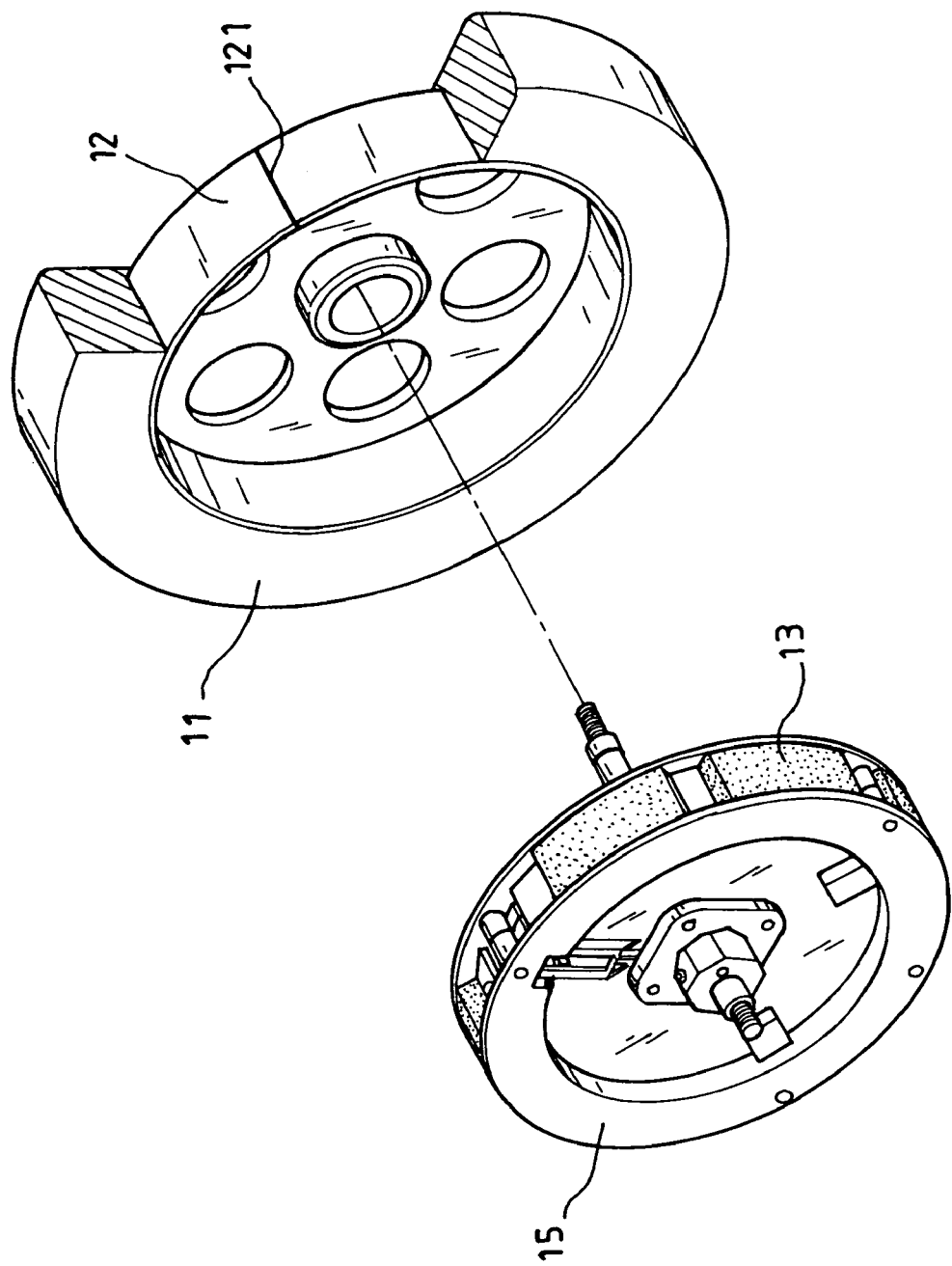
FIG. 3 is a perspective view of a magnetic ring to be internally mounted on the magnetic control wheel of the prior art.
Figure 4:
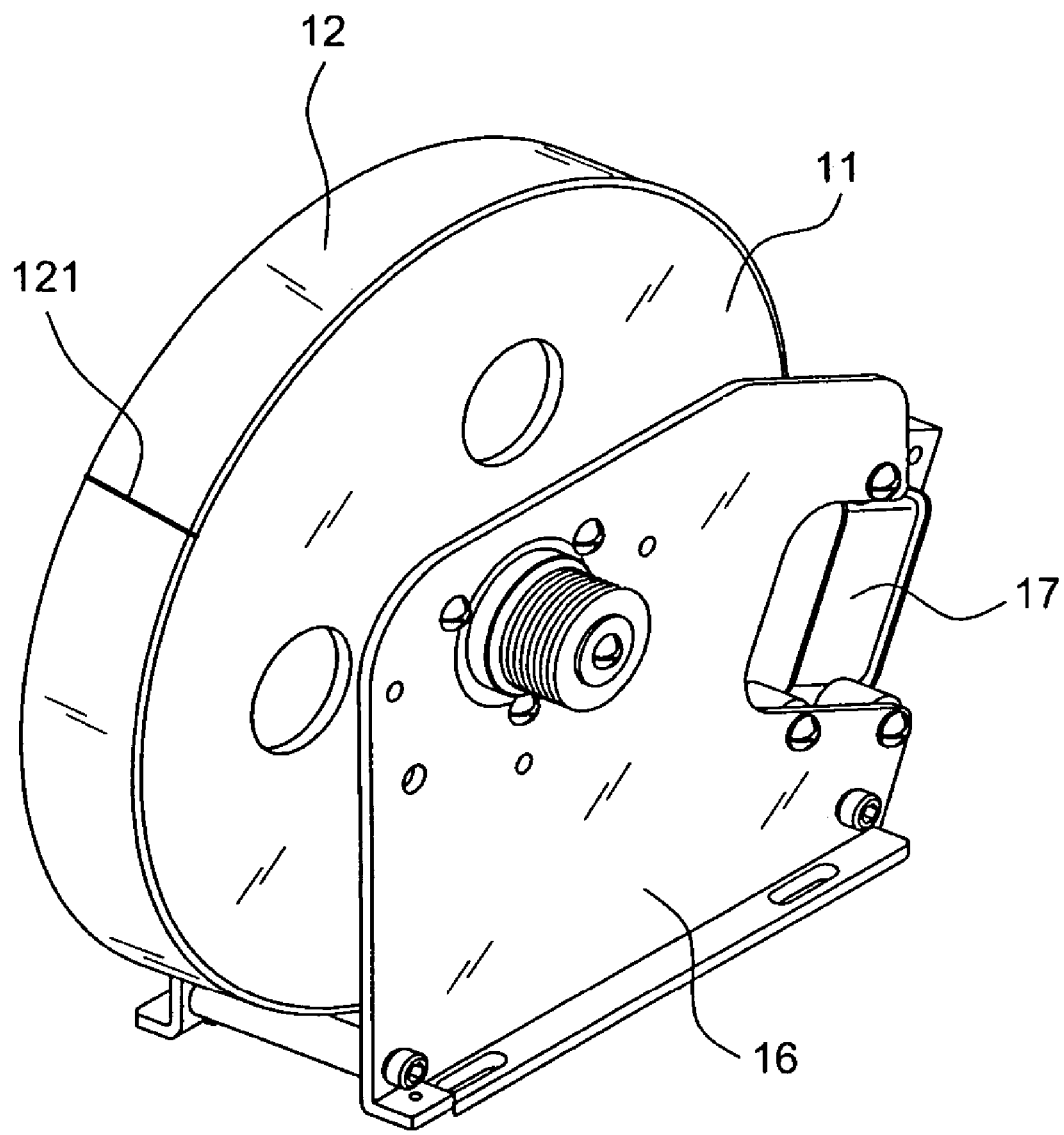
FIG. 4 is a perspective view of a magnetic control wheel with an electromagnetic type magnetic ring.
Figure 5:
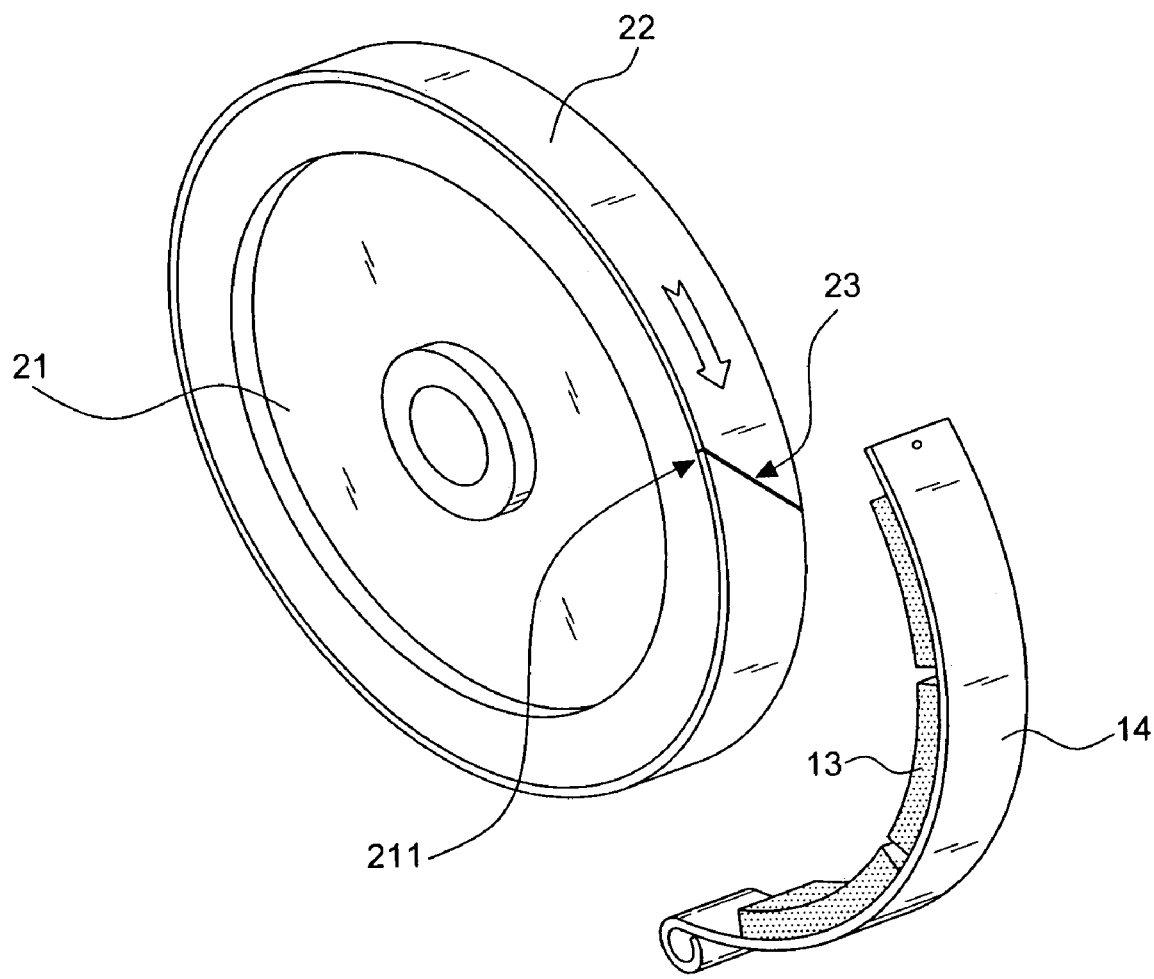
FIG. 5 is a perspective view of a first embodiment of the invention.

First of all, referring to FIG. 5, a first embodiment in accordance with the invention includes a flywheel 21 and a magnetic ring 22.

The magnetic ring 22 is a plate with magnetic permeability that is mounted around the periphery of the flywheel 21.

The connection line at the front and rear joint of the magnetic ring 22 meets an end face 211 of the flywheel 21 at a non-right angle. According to FIG. 5, the connection line is an oblique line 23. The reaction of this connection line to the magnetic field of the magnets 13 is focused at only one point rather than at a line at the same time. In this way, the vibration and noise of the magnetic control wheel can be considerably minimized to achieve a longer service life.

As for the oblique line 23, the connection at the joint is identical to the prior art. Therefore, no additional cost will arise. In addition, it is confirmed by long-term experiments that this arrangement can protect the magnetic gap and the magnetic field from direct face-to-face collision. Thus, the structure in accordance with the invention can be regarded as a progressive novelty.

Figure 6:
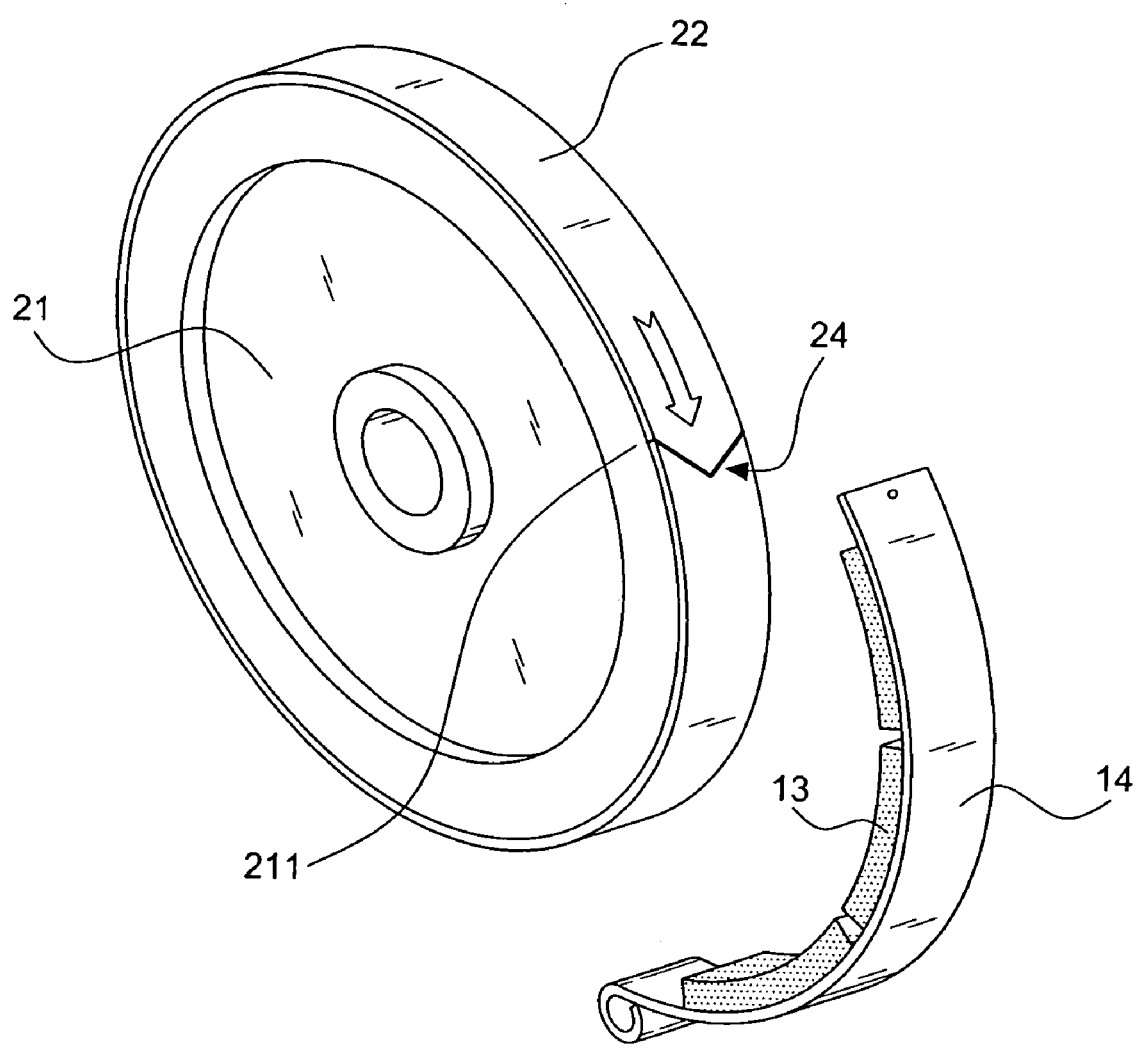
FIG. 6 is a perspective view of a first embodiment of the invention.

Referring to FIG. 6, a second embodiment of the invention is illustrated. The elements of the second embodiment identical to those of the first embodiment are marked with the same reference signs. The difference lies in that the connection line is a V-shaped line 24. The reaction of this connection line to the magnetic field of the magnets 13 is focused at only one or two points at the same time. Accordingly, the vibration and noise can be minimized, too.

Figure 7:
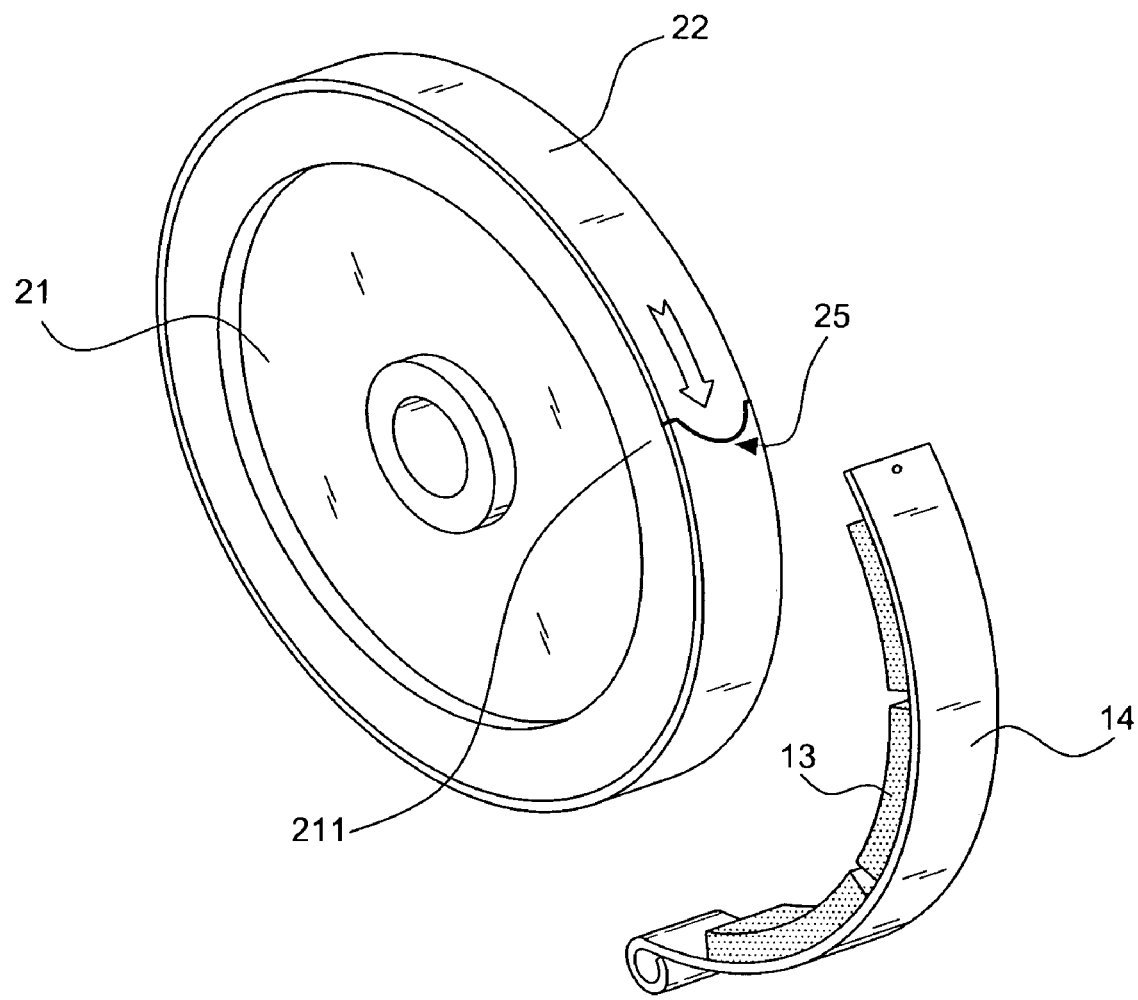
FIG. 7 is a perspective view of a first embodiment of the invention.

Referring to FIG. 7, a third embodiment of the invention is illustrated. The elements of the third embodiment identical to those of the previous embodiments are marked with the same reference signs. The difference lies in that the connection line is a circular arc line 25 non-perpendicular to the end face 211 of the flywheel 21. Accordingly, the same effect of the previous embodiments can be achieved as well.

All in all, the invention tries to change the joint of the magnetic ring 22 in such a way that the line at the joint meets the end face 211 of the flywheel 21 at a non-right angle. In addition, it is confirmed that this design can exactly eliminate the drawbacks of the prior art and achieves the expected effect of reducing vibration and noise for a longer service life.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:
1. A magnetic control wheel, comprising:
 a) a flywheel having opposing end faces;
 b) a magnetic ring comprising a plate having magnetic permeability and mounted around the periphery of the flywheel;
 c) at least one arcuate connection line of said magnetic ring extending across the magnetic ring between said opposing end faces of said flywheel, said connection line continuously arcuate in contour forming a substantially semi-circular contour extending across the entire peripheral surface of said flywheel.

* * * * *